United States Patent [19]
Polesel

[11] Patent Number: 4,878,313
[45] Date of Patent: Nov. 7, 1989

[54] CONTAINER ASSEMBLY
[75] Inventor: Giampaolo Polesel, Conegliano, Italy
[73] Assignee: RESMA S.R.l., Gaiarine, Italy
[21] Appl. No.: 154,432
[22] Filed: Feb. 5, 1988

Related U.S. Application Data
[63] Continuation of Ser. No. 895,023, Aug. 8, 1986, abandoned.

[30] Foreign Application Priority Data
Aug. 9, 1985 [IT] Italy .............................. 30783/85[U]

[51] Int. Cl.4 ............................................. A01G 9/10
[52] U.S. Cl. .......................................... 47/87; 47/73; 206/509; 206/511
[58] Field of Search ........................ 47/39, 77, 82-87, 47/73, 1.1; 211/74, 126; 206/509, 511

[56] References Cited
U.S. PATENT DOCUMENTS

| | | | |
|---|---|---|---|
| 3,889,416 | 6/1975 | Bergeron et al. | 47/86 |
| 3,931,694 | 1/1976 | Krixorian | 47/87 |
| 3,935,673 | 2/1976 | Robins | 47/1.1 X |
| 3,949,523 | 4/1976 | Lehtipun | 47/87 X |
| 4,050,188 | 9/1977 | van Wingerden | 47/85 |
| 4,113,329 | 9/1978 | Thurman | 206/509 X |
| 4,242,834 | 1/1981 | Olsen | 47/85 X |
| 4,299,054 | 11/1981 | Warb | 47/84 X |
| 4,495,725 | 1/1985 | Talbott | 47/85 |
| 4,658,542 | 4/1987 | Holmberg | 47/86 |

FOREIGN PATENT DOCUMENTS

| | | | |
|---|---|---|---|
| 3238594 | 4/1984 | Fed. Rep. of Germany | 47/73 |
| 962699 | 6/1950 | France | 47/85 |
| 2390088 | 1/1979 | France | 47/83 |
| 2543793 | 10/1984 | France | 47/77 |
| 7406925 | 11/1975 | Netherlands | 47/87 |
| 8500066 | 3/1986 | Netherlands | 47/39 |
| 1214837 | 12/1970 | United Kingdom | 47/83 |
| 1384981 | 2/1975 | United Kingdom | 47/87 |
| 83/03518 | 10/1983 | World Int. Prop. O. | 47/84 |

Primary Examiner—Danton D. DeMille
Attorney, Agent, or Firm—Guido Modiano; Albert Josif

[57] ABSTRACT

This containment structure comprises a sheet-like container defining a plurality of cells for accommodation therein of small plants, in particular for cultivations in greenhouses, and a container holder having a substantially box-like shape. The containment holder removably supports the container and has engagement members allowing easy and reliable stacking of a plurality of such structures, cross-pieces for setting the position of the container with respect to the holder and recesses in the lateral walls for aerating the small plants accommodated in the cells.

12 Claims, 2 Drawing Sheets

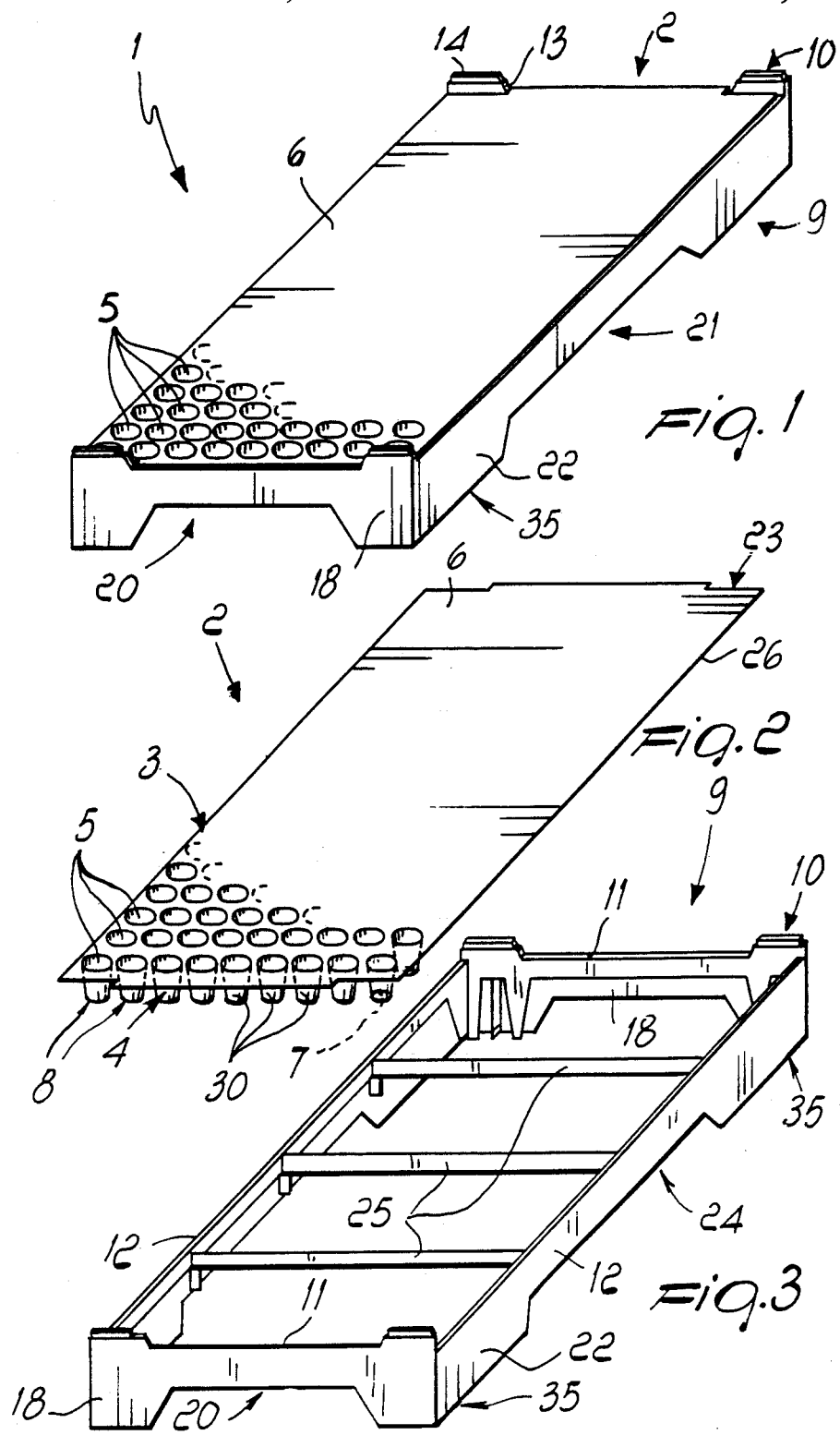

CONTAINER ASSEMBLY

This is a continuation of 06/895023 filed 08/08/86 now abandoned.

BACKGROUND OF THE INVENTION

This invention relates to a container assembly, particularly for small horticultural-floral plants.

Nowadays to plant small plants in greenhouses small pots or containers having a plurality of cells are generally employed.

Such known types have some drawbacks, including poor practical transportability of same, with consequent increased expense also for their location and dislocation inside the greenhouse.

SUMMARY OF THE INVENTION

It is the main aim of this invention to eliminate the above indicated drawbacks affecting known types, by devising a container assembly which affords optimum planting for small plants cultivated in greenhouses and at the same time their easy transportation to and from the greenhouses.

Within the above-outlined aim it is a further important object to provide a container assembly which enables its stacking in a rapid way, even for prolonged time periods and with the plants accommodated therein, without in any way damaging the small plants.

The aim and objects set forth above are achieved by a containment structure, particularly for small horticultural-floral plants, according to the appended claims.

BRIEF DESCRIPTION OF THE DRAWINGS

The features and advantages of the invention will be more clearly apparent from the detailed description of an embodiment thereof shown by way of illustration in the accompanying drawing sheets in which:

FIG. 1 shows a three-quarter perspective view of the container assembly;

FIG. 2 shows a three-quarter perspective view of the container;

FIG. 3 is a similar view of the container holder;

DESCRIPTION OF THE PREFERRED EMBODIMENTS

Figure 4:
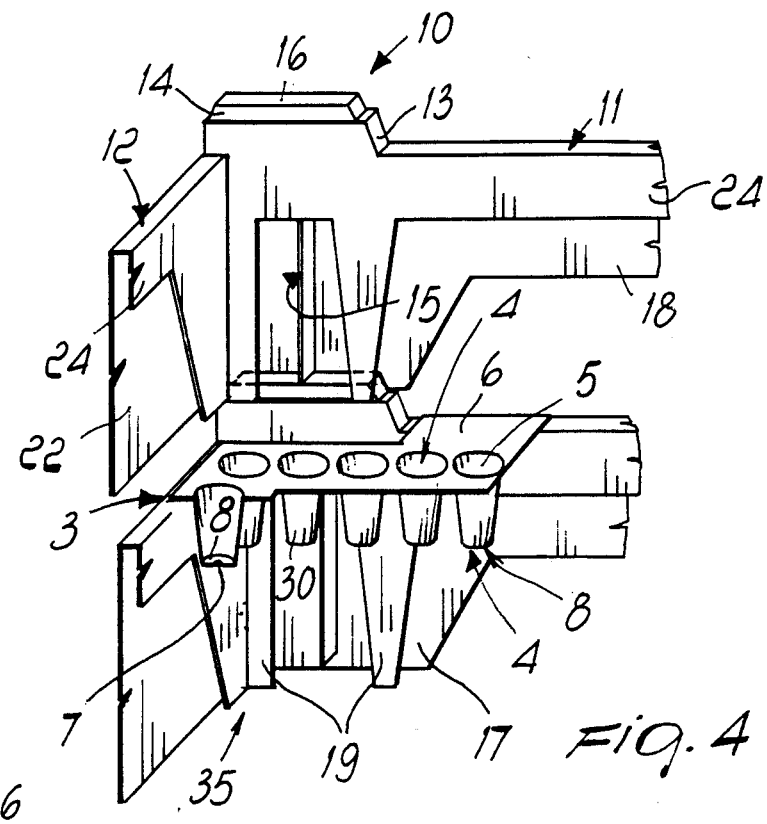
FIG. 4 is a partial perspective view of two stacked container assemblies.

With reference to the drawing figures, the containment structure 1 comprises a container tray 2 consisting of a sheet-like planar body 3 formed preferably from vacuum molded polystyrene. The container 2 has a plurality of cells 4, aligned to one another, defined by essentially frusto-concial containment bodies 30 and formed by hollow projections downwardly protruding from the planar body 3, such cells defining an upper opening 5 at the surface 6 of the sheet and a lower hole 7 for letting out the excess water at the smaller base 8 of body 30, depending from the surface 6. The number of the cells may vary in a broad range, in particular the container 2 may comprise 336 or 312 cells 4. The container assembly 1 also comprises a frame structure or container holder 9, having an open box-like structure, preferably of a shock-resistant plastic material and including two transverse sides 11 and two longitudinal sides 12 respectively defined by lateral walls 18 and 22. The top surface of the edges of side walls 18, 22 lie approximately in the same plane and define an upper open major surface. The bottom lowermost edges of side walls 18, 22 also lie approximately in the same plane and define a bottom open major surface. As visible from the drawings, the walls 18, 22 have inwardly bent edges 24, while the container holder 9 further comprises at the four corners thereof engagement means 10 projecting upwardly of the peripheral transverse sides 11.

Such means 10, having a width many times smaller than the length of the sides 11, are equal to each other and specular with respect to the longitudinal mid-axis of the container holder 9.

Such means 10 consist of a protruding male member projecting from the upper major surface of the holder 9 and an accommodation seat facing the lower major surface and vertically aligned to the male member, the male members and the accomodation seats being adapted to mutually engage upon two container assemblies 1 being stacked one upon the other. In particular the protruding member comprises a first elevation 13 of essentially parallelepipedal shape with trapezoidal longitudinal cross-section, and a second elevation 14 protruding from the latter, with a similar shape and slightly smaller dimensions.

Both elevations preferably have a hollow inside, accommodating an abutment element 15 rigid with the elevations and so arranged to rest on the flat top surface 16 of the second elevation 14 of a lower container holder 9, when two such holders are stacked. Preferably the abutment elements 15 comprise each a small rib rigid with the inside surface 17 of the walls 18 of the transverse sides 11.

Figure 5:
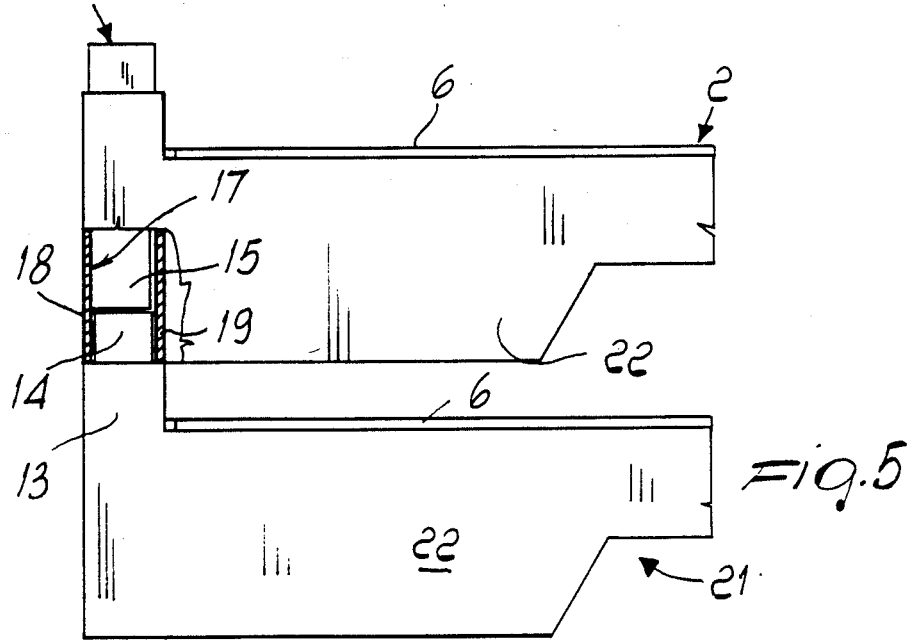
FIG. 5 is a partial side view of two stacked container assemblies, wherein a portion of the upper assembly has been broken away, for illustrating the engagement between the two assemblies.

Under the elevations 13, 14 and in parallel to the walls 18 of the transverse sides 11 there are present two lugs 19 having the same length and defining with walls 18 the accommodation seats, the ends of said lugs 19 and the portions of the walls 18 underlying the engagement means 10 resting, once two structures 1 are stacked, at the peripheral edges of the first elevation 13 of the lower structure 1 (see FIG. 5).

At each wall 18 there is formed an opening or recess formation 20 adapted to permit aeration of the small plants once two structures are stacked, similar openings or recess formations 21 being formed at the longitudinal side walls 22 of the container holder 9. As visible, the recess formations extend at intermediate portions of the lateral walls at a position facing the bottom surface of the holder 9, the recess formations laterally delimiting between each four feet portions which thus extend at the holder corners. As further clearly visible from FIG. 4, the height of the projections is smaller than the height of the lateral walls even at the portions thereof provided with the recess formations or openings 20, 21 so that even in the stacked condition, between the bases 8 of the bodies 30 and the bottom major surface of the holder 9 and to the sheet-like planar body of the underlying container assembly an interspace is formed which allows aeration of the small plants tilled in the lower container assembly.

The conformation of the sheet-like body 3 is essentially rectangular, the latter having a peripheral edge for resting on the lateral walls of the holder structure and, at the four corners, recesses 23 conforming with the elevation 13.

Support elements 25 further extend between the two opposed edges 24 of the longitudinal side walls 22, such elements also having the function of holding the containers 2 in a set position with respect to the related holders 9. In particular the support elements 25 comprise crosspieces arranged at such locations as to extend between two adjacent rows of cells of the related container 2.

The utilization of the containment structure 1 envisages the planting of the small plants into the cells 4; subsequently or prior to that operation the container 2 may be placed onto the container holder 9, the peripheral edges 26 of the sheet 3 resting on the sides 11 and 12 of the container holder 9.

The position of the container 2 with respect to the latter is determined by the elements 25 which secure the container 2 engaging themselves between two adjacent rows of cells.

Thus, the container assembly may be easily transported even if stacked onto other like container assemblies, by virtue of the engagement of the protruding elevation 14 between the ends of the transverse walls 18 and the lugs 19. The abutment element 15 imparts to the stack of container assemblies a high degree of stability, since the length of the abutment element is selected so as to allow accommodation of the second elevation 14 between the wall 18 and the lugs 19 and resting of the lower end of the element 15 on the top surface 16.

Preferably the diameters of the upper and lower bases of the cells 4 are 19.5 mm and 12.5 mm respectively, their height 25.5 mm. The hole 7 has a diameter of 6 mm.

Therefore, as explained, the container assembly 1 allows accommodation of a considerable number of small plants, may be transported in a rapid, easy and reliable manner thus speeding up the loading and unloading operations for their location in the greenhouses and rationalizing the loading and unloading operations onto and from motor vehicles.

The presence of the openings 20 and 21 further enables, in the instance of several container assemblies being stacked, the small plants contained therein to be aerated in an optimum manner without jeopardizing their growth.

Of course, the materials used and the dimensions may be any contingent ones, according to the requirements.

I claim:

1. A container assembly adapted for small plants, comprising an integral box-like frame structure and a sheet-like container tray, said frame structure including:
   two pairs of parallel planar lateral walls, said pairs of lateral walls being connected to define a parallelepipedal shape with four corners, each said lateral wall having upper and bottom edges, said upper and bottom edges being sapced apart from each other by a predetermined distance and respectively defining upper and bottom open surfaces,
   four elevations each integrally and vertically projecting adjacent a respective corner of said lateral walls,
   first engagement means formed on said elevations,
   second engagement means including four downwardly extending vertical extensions projecting downwardly adjacent a respective corner, said second engagement means being vertically aligned with said first engagement means to allow engagement with said first engagement means of a second, like container assembly, said first and second engagement means being defined by cooperating male and female engagement means, and
   support members extending between and interconnecting lateral walls of one of said pairs,
   said sheet-like container tray comprising:
      a sheet-like planar body, said body resting on said support members, said sheet-like planar body having an extension substantially equal to said upper open surface and a peripheral edge bearing on said upper edges of said lateral walls of said frame structure,
      a plurality of hollow projections protruding from said planar body toward said bottom open surface and defining cells for accomodating root mediums, each of said hollow projections having a base portion with a bottom drain remote from said sheet-like planar body, the distance of said base portion from said sheet-like planar body defining a projection height which is smaller than said predetermined distance such that, when said sheet-like container tray is laid onto said frame structure, said base portions are raised with respect to said bottom open surface and define an aeration space, said peripheral edge defining corner recesses to accomodate said elevations.

2. A container assembly adapted for small plants, comprising an integral box-like frame structure and a sheet-like container tray, said frame structure including:
   two pairs of parallel planar lateral walls, said pairs of lateral walls being connected to define a parallelepipedal shape with four corners, each said lateral wall having upper and bottom edges, said upper and bottom edges being spaced apart from each other by a predetermined distance and respectively defining upper and bottom open surfaces,
   four elevations each integrally projecting adjacent a respective corner of said lateral walls, said elevations having an outer delimiting wall vertically aligned with said lateral walls,
   first engagement means formed on said elevations,
   second engagement means including four downwardly extending vertical extensions projecting downwardly adjacent a respective corner, said second engagement means being vertically aligned with said first engagement means to allow engagement with said first engagement means of a second, like container assembly, said first and second engagement means being defined by cooperating male and female engagement means, and
   support members extending between and interconnecting the lateral walls of one of said pairs,
   said sheet-like container tray comprising:
      a sheet-like planar body adjacent to said upper edges on said upper open surface and said body resting on said support members, said sheet-like planar body having an extension substantially equal to said upper open surface and a peripheral edge bearing on said upper edges of said lateral walls of said frame structure,
      a plurality of hollow projections protruding from said planar body toward said bottom open surface and defining cells for accomodating root mediums, each of said hollow projections having a base portion with a bottom drain remote from said sheet-like planar body, the distance of said base portion from said sheet-like planar body defining a projection height which is smaller than said predetermined distance such that, when said sheet-like container is laid onto said frame structure, said base portions are raised with respect to said bottom open surface and define an aeration space, said peripheral edge defining corner recesses to accomodate said elevations.

3. A container assembly according to claim 2, wherein said elevations have an elongated shape and project from a first pair of said pairs of parallel lateral walls.

4. A container assembly adapted for small plants, comprising an integral box-like parallelepipedal frame structure and a sheet-like container tray, said frame structure including:

two pairs of parallel planar lateral walls, said pairs of lateral walls being connected to define four corners and each having upper and bottom edges, said upper and bottom edges respectively defining upper and bottom open surfaces, four elevations each integrally projecting adjacent a respective corner of said lateral walls, said elevations having outer delimiting walls vertically aligned with said lateral walls, first engagement means formed in said elevations, foot portions integrally formed in each of said lateral walls at a respective one of said corners of said lateral walls, each of said foot portions being vertically aligned with a respective one of said elevations and having elevations and each foot portion having outer delimitation walls vertically aligned with said lateral walls, said foot portions defining between each other recess formations in said lateral walls with an open edge facing said bottom open surface, second engagement means formed in said foot portions, said second engagement means being vertically aligned with said first engagement means to allow engagement with said first engagement means of a second, like container assembly, said first and second engagement means being defined by cooperating male and female engagement means, and support members extending between and interconnecting the lateral walls of one of said pairs, said sheet-like container tray comprising:

a sheet-like planar body adjacent to said upper edges on said upper open surface and said body resting on said support members, said sheet-like planar body having an extension substantially equal to said upper open surface and a peripheral edge bearing on said upper edges of said lateral walls of said frame structure, a plurality of hollow projections protruding from said planar body toward said bottom open surface and defining cells for accomodating root medium, each of said hollow projections having a base portion with a bottom drain remote from said sheet-like planar body, said base portion extending at a distance from the sheet-like planar body, said distance being smaller than the distance between the upper and bottom open surfaces such that the space between the base portion and the upper open surface of a further stacked container assembly therebelow defining an aeration space, and said peripheral edge defining corner recesses to accomodate said four elevations.

5. A container assembly according to claim 4, wherein said sheet-like planar body is made of vacuum molded polystyrene and said hollow projections define a substantially frusto-conical body having a top opening lying in the same plane with said planar body and said base portion being smaller than said top opening.

6. A container assembly according to claim 4, wherein said frame structure is made of shock-resistant plastic material.

7. A container assembly according to claim 4, wherein each said outer delimiting walls of said elevations comprise a first elevation vertically and integrally projecting from said lateral walls, each said first engagement means comprise a second elevation vertically and integrally projecting from said first elevation, and said second engagement means comprise each a cavity, said second elevations adapted to engage in said cavities of a second, like container assembly stacked thereover, said first elevation having a first cross-section and said second elevation having a second cross-section, smaller than said first cross-section.

8. A container assembly according to claim 4, wherein said second engagement means comprise cavities which are laterally defined by said foot portions of said lateral walls and by protruding lugs extending from said upper open surface parallel to and at a distance from said lateral walls.

9. A container assembly according to claim 4, wherein each said outer delimiting walls of said elevations comprise a first elevation vertically and integrally projecting from said lateral walls, each said first engagement means comprise a second elevation vertically and integrally projecting from said first elevation and each said second engagement means comprise a cavity, said second elevations adapted to engage, in said cavities of a second, like container assembly stacked thereover, said first elevation having a first width and said second elevation having a second width smaller than said first width, said first and second elevations being hollow and accomodating an abutment rib rigid with said elevations, said abutment rib having such a length as to abut on the second elevation of a further container assembly stacked thereover, and wherein said cavities are formed between said foot portions of said lateral walls and protruding lugs extending from said upper open surface parallel to and at a distance from said lateral walls, said distance of said protruding lugs from said lateral walls being at least equal to said second width.

10. A container assembly according to claim 4, wherein said elevations have an elongated shape and project from a first pair of said pairs of parallel lateral walls.

11. A container assembly according to claim 4, wherein said cells are aligned in rows and said support members comprise at least one cross-piece extending between said lateral walls of one of said pairs parallel to said lateral walls of another one of said pairs, said cross-piece extending between two adjacent rows of cells.

12. A container assembly according to claim 11, wherein said support members extend at a mutual distance which is greater than a space separating said rows of cells.

* * * * *